(12) United States Patent
Fish

(10) Patent No.: US 6,842,971 B2
(45) Date of Patent: Jan. 18, 2005

(54) PALLET PRESSURE MONITOR

(75) Inventor: Larry Fish, Madison, KS (US)

(73) Assignee: Vektek, Inc., Emporia, KS (US)

( * ) Notice: Subject to any disclaimer, the term of this patent is extended or adjusted under 35 U.S.C. 154(b) by 230 days.

(21) Appl. No.: 10/309,581

(22) Filed: Dec. 3, 2002

(65) Prior Publication Data

US 2004/0103527 A1 Jun. 3, 2004

(51) Int. Cl.[7] .......................... B23Q 17/00; B23Q 3/08; B23Q 15/00; G01L 7/00
(52) U.S. Cl. .............................. 29/714; 29/720; 73/700; 269/25
(58) Field of Search ...................... 29/714, 720, 407.08, 29/708, 721; 73/700, 714, 753, 31.04; 269/25, 24, 27, 30

(56) References Cited

U.S. PATENT DOCUMENTS

| | | | | |
|---|---|---|---|---|
| 3,998,127 A | * | 12/1976 | Romeu | ........................ 409/225 |
| 4,052,574 A | * | 10/1977 | Brown | ..................... 200/83 P |
| 4,583,631 A | * | 4/1986 | Yonezawa et al. | ....... 198/345.3 |
| 4,609,002 A | * | 9/1986 | Noh et al. | |
| 5,053,774 A | | 10/1991 | Schuermann et al. | |
| 5,214,419 A | | 5/1993 | DeMond et al. | |
| 5,695,177 A | * | 12/1997 | Mascola | ....................... 269/24 |
| 5,887,430 A | * | 3/1999 | Hirai et al. | .................... 60/433 |
| 6,249,212 B1 | | 6/2001 | Beigel et al. | |

OTHER PUBLICATIONS

SPX HYTEC Brochure H9901 (Not Dated).

* cited by examiner

*Primary Examiner*—David P. Bryant
(74) *Attorney, Agent, or Firm*—Hovey Williams LLP

(57) ABSTRACT

A pallet pressure monitor (10) broadly comprises a pressure detector (14) to sense hydraulic pressure within a hydraulic system (16) of a pallet (22), a pallet transmitter (18) to monitor the detector (14), and a receiver unit (20) to receive a status signal from the pallet transmitter (18) indicative of the detector's status. The detector (14) preferably comprises an adjustable pressure switch. The pallet transmitter (18) preferably receives power through a wireless connection to the receiver unit (20). The receiver unit (20) preferably receives the status signal from the pallet transmitter (18) over the wireless connection and actuates a relay output (30) according to the status signal. The relay output (30) is preferably electrically connected to a warning unit (32), or other signaling device, that warns an operator when the pressure in the hydraulic system (16) is below a set-point.

20 Claims, 2 Drawing Sheets

PALLET PRESSURE MONITOR

BACKGROUND OF THE INVENTION

1. Field of the Invention

The present invention relates to pressure monitors. More particularly, the present invention provides a pallet pressure monitor capable of conveniently detecting hydraulic pressure applied to a hydraulic system of a machine pallet with no physical connections to the pallet.

2. Description of Prior Art

Hydraulic clamping devices are commonly used in manufacturing operations to clamp workpieces to fixtures or pallets so that the workpieces may be machined or otherwise processed. Workpieces can only be safely machined when secured by forcing pressurized hydraulic fluid into clamps. Therefore, in order to protect operators, equipment, and materials from damage, it is important to detect fluid pressure to ensure the clamps have been actuated.

Current methods of monitoring such fluid pressure include wiring pressure detectors to signaling devices. However, detectors and signaling devices are typically mounted in different locations. For example, detectors are typically mounted to pallets while signaling devices are typically mounted at eye-level in order to signal operators. This requires cabling between the detectors and signaling devices. Unfortunately, such cabling is often in the way of operators obstructing vision and movement. Additionally, cabling is often damaged because it must frequently flex during machining which leads to fatigue and failure. Thus, cabling can be troublesome and must be replaced frequently.

Accordingly, there is a need for an improved pallet pressure monitor that overcomes the limitations of the prior art.

SUMMARY OF THE INVENTION

The present invention overcomes the above-identified problems and provides a distinct advance in the art of pressure monitors. More particularly, the present invention provides a pallet pressure monitor capable of conveniently detecting hydraulic pressure applied to a hydraulic system of a machine fixture or pallet with no physical connections to the pallet.

The monitor broadly comprises a pressure detector to sense the pressure within the hydraulic system, a pallet transmitter to monitor the detector, and a base unit to receive a status signal from the pallet transmitter indicative of the detector's status. The machine preferably includes a pallet designed to support a workpiece while the workpiece is being machined or otherwise processed. The workpiece is preferably secured to the pallet by a plurality of hydraulic clamps which are actuated by forcing pressurized hydraulic fluid into the hydraulic system.

In a preferred embodiment, the detector comprises an adjustable pressure switch in fluid communication with the hydraulic system. The switch is preferably adjustable through an adjustment screw allowing a technician to select a pressure set-point, such as ten pounds per square inch (PSI). For example, as pressure rises within the hydraulic system, the fluid presses against a diaphragm within the switch. When the pressure reaches the set-point, the diaphragm closes a set of contacts within the switch. In this case, the switch operates as a normally open switch and the detector provides a discrete pressure signal representative of the detector's status.

The pallet transmitter preferably incorporates a passive integrated circuit (IC) that receives power through a wireless connection to the base unit and monitors the detector. For example, the pallet transmitter may receive power in the form of electromagnetic energy that powers both the IC and the detector. The pallet transmitter responds to the pressure signal by transmitting the status signal over the wireless connection. The status signal may include a serial number uniquely identifying the pallet transmitter and a status number reflecting the pressure signal. For example, the status number may be a one when the contacts of the switch are closed and a zero when the contacts of the switch are open.

The receiver unit preferably includes a power input, an electromagnetic energy transmitter (EET) to provide power to the pallet transmitter, a signal receiver to receive the status signal from the pallet transmitter, and at least one relay output actuated by the signal receiver according to the status signal. The EET preferably converts the power accepted through the power input into the electromagnetic energy and transmits the electromagnetic energy to the pallet transmitter over the wireless connection. The relay output is preferably electrically connected to a warning unit, or other signaling device, that warns an operator of the machine when the pressure in the hydraulic system is below the set-point.

In use, the operator preferably places the workpiece on the pallet and activates the hydraulic system. A pump preferably forces the fluid into the hydraulic system, thereby actuating the clamps and the detector. The pallet transmitter substantially continuously monitors the detector and alters the status signal accordingly. The receiver unit substantially continuously receives the status signal and actuates the relay output accordingly. Thus, when the pressure in the hydraulic system reaches the set-point, the contacts in the detector preferably close, causing the status signal to change. When the status signal changes, the relay output also changes, causing the warning device to indicate that the workpiece is secured to the pallet and that it is now safe to machine the workpiece.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
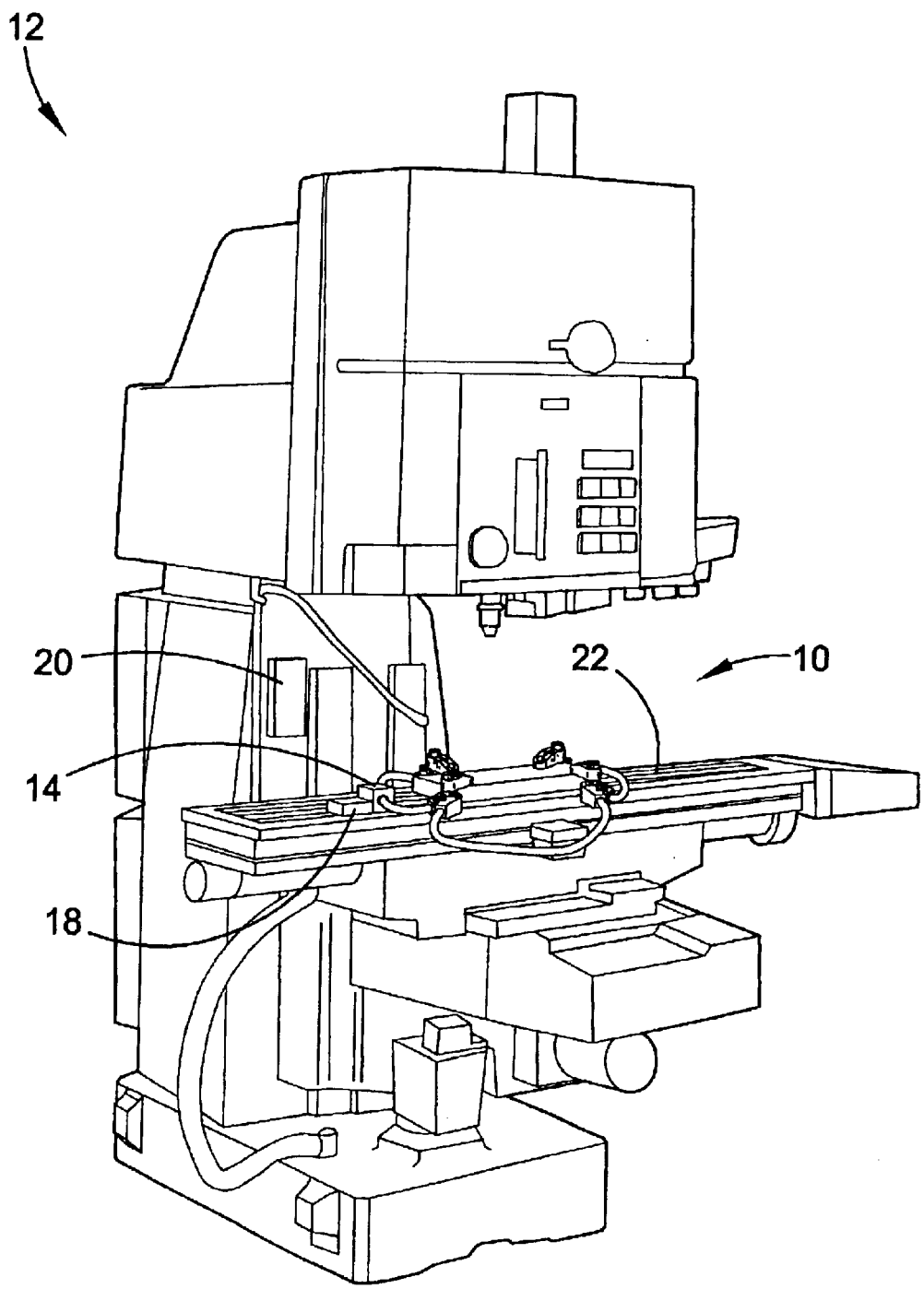
FIG. 1 is a perspective view of a pallet pressure monitor constructed in accordance with a preferred embodiment of the present invention and shown installed on a machine.
Figure 2:
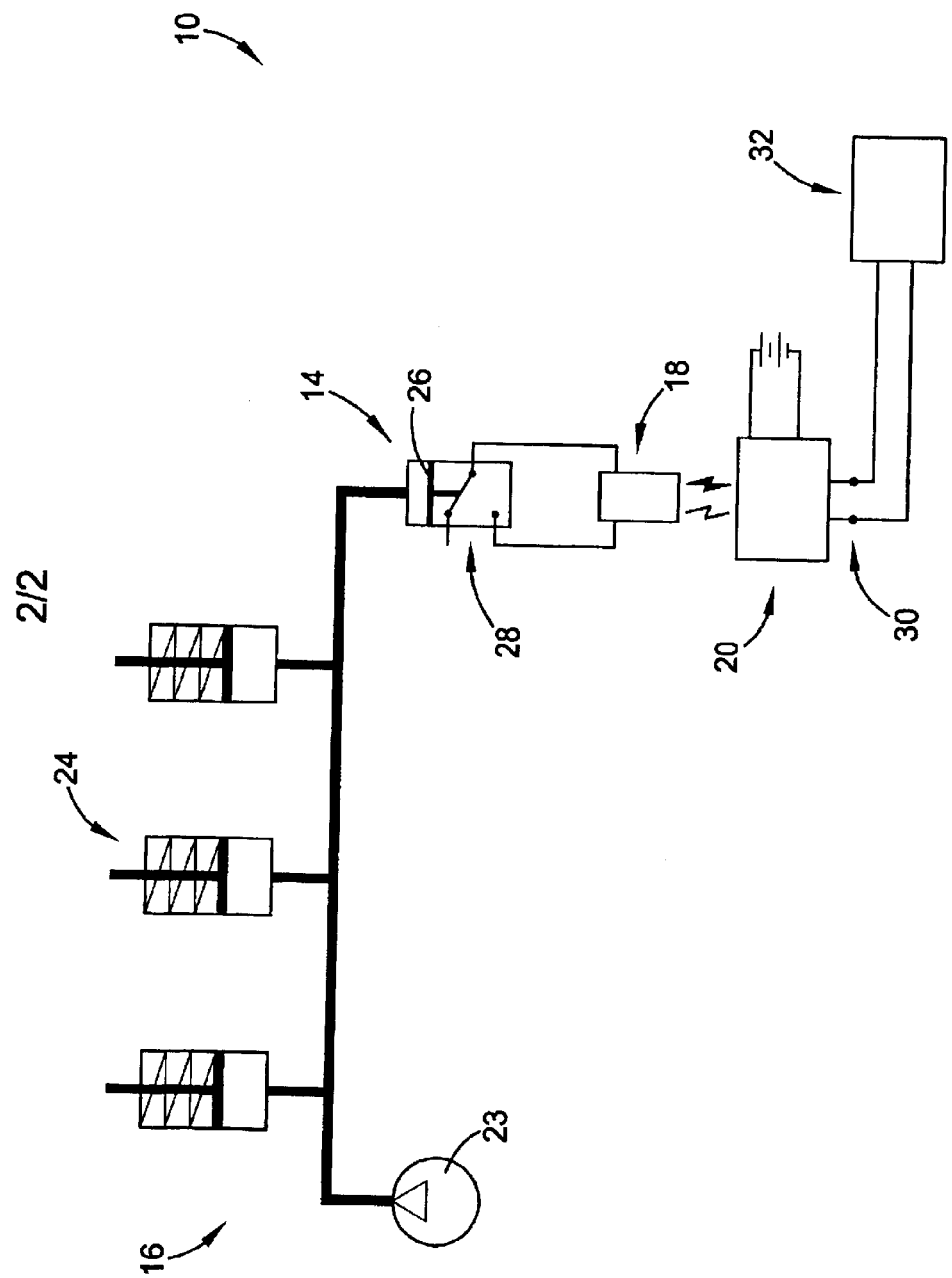
FIG. 2 is a combination hydraulic and electrical schematic of the monitor.

Referring to FIG. 1, the preferred pallet pressure monitor 10 constructed in accordance with a preferred embodiment of the present invention is illustrated installed on a machine 12. Referring also to FIG. 2, the monitor 10 broadly comprises a pressure detector 14 to sense hydraulic pressure within a hydraulic system 16 of the machine, a pallet transmitter 18 to monitor the detector 14, and a receiver unit 20 to receive a status signal from the pallet transmitter 18 indicative of the detector's status. The machine 12 may be similar to that disclosed in "UNIVERSAL MILLING MACHINE", U.S. Pat. No. 3,998,127, incorporated herein by reference, and preferably includes a pallet 22 designed to support a workpiece while the workpiece is being machined or otherwise processed by the machine 12. The workpiece is preferably secured to the pallet 22 by a plurality of hydraulic clamps 24, such as those disclosed in "HYDRAULIC SWING CLAMP APPARATUS HAVING SPEED CONTROL MECHANISM", U.S. Pat. No. 5,695,177, incorporated herein by reference.

The workpiece is typically only secured to the pallet 22 when the pressure is applied to the hydraulic system 16. For example, a pump 23 may be used to actuate the clamps 24 by forcing pressurized hydraulic fluid into the hydraulic system 16. Therefore, in the interest of safety, the workpiece is preferably only machined or otherwise processed by the machine 12 while the pressure is applied to the hydraulic system 16. Thus, the monitor 10 of the present invention preferably indicates when it is safe to machine the workpiece by indicating when the pressure is applied to the hydraulic system 16.

In the preferred embodiment, the detector 14 comprises an adjustable pressure switch in fluid communication with the hydraulic system 16. The switch is preferably adjustable through an adjustment screw and may be similar to that disclosed in "PRESSURE SWITCH WITH SNAP-TOGGLE ADJUSTING MEANS", U.S. Pat. No. 4,052,574, incorporated herein by reference. The screw allows a technician to select a pressure set-point, such as ten pounds per square inch (PSI). For example, as pressure rises within the hydraulic system 16, the fluid presses against a diaphragm 26 within the switch. When the pressure reaches the set-point, the diaphragm 26 preferably closes a set of contacts 28 within the switch. In this case, the switch operates as a normally open switch. Alternatively, the switch may operate as a normally closed switch and open the contacts 28 when the pressure reaches the set-point. In either case, the detector 14 provides a discrete pressure signal representative of the detector's status, or the pressure within the hydraulic system 16 as compared with the set-point.

The pallet transmitter 18 preferably incorporates a passive integrated circuit (IC) that receives power through a wireless connection to the receiver unit 20. For example, the pallet transmitter 18 may receive power in the form of electromagnetic energy at approximately 126 kilohertz (KHz). The electromagnetic energy is preferably the only power provided to the pallet transmitter 18 and used to power both the IC and the detector 14.

The IC preferably monitors the detector 14 and responds by transmitting the status signal at approximately 232 megahertz (MHz). The status signal may include a serial number uniquely identifying the pallet transmitter 18 and a status number reflecting the pressure signal. For example, the status number may be a one when the contacts 28 of the switch are closed and a zero when the contacts 28 of the switch are open.

The receiver unit 20 preferably includes a power input, an electromagnetic energy transmitter (EET) to provide power to the pallet transmitter 18, a signal receiver to receive the status signal from the pallet transmitter 18, and at least one relay output 30 actuated by the signal receiver according to the status signal. The power input preferably accepts power at approximately twenty-four volts which may be either direct current or alternating current. The EET preferably converts the power accepted through the power input into the electromagnetic energy and transmits the electromagnetic energy to the pallet transmitter 18.

The relay output 30 is preferably electrically connected to a warning unit 32, or other signaling device, that warns an operator of the machine 12 when the pressure in the hydraulic system 16 is below the set-point. The relay output 30 is preferably able to withstand significant current flow, such as five amps, so that the relay output 30 may be used to drive most any signaling device. For example, the warning unit 32 may incorporate lights, sirens, or other indicators.

As discussed above, the receiver unit 20 preferably transmits the electromagnetic energy to the pallet transmitter 18 which responds by transmitting the status signal back to the receiver unit 20. Thus, a separation distance between the pallet transmitter 18 and the receiver unit 20 can be critical. In order to minimize power requirements and external interference, the separation distance is preferably no greater than approximately twelve inches. More specifically, in order to ensure reliable operation of the monitor 10, the separation distance is preferably between five and eight inches.

It is also important to note that the pallet transmitter 18 is preferably offset from the pallet 22 itself. The pallet 22 is typically constructed of metal and may therefore interfere with the operation of the pallet transmitter 18. Thus, the pallet transmitter 18 is preferably offset from the pallet 22 by at least one quarter inch. While there is no theoretically maximum offset, practicality typically limits the offset to approximately eight inches. The offset is preferably embodied by an air gap, but may be embodied by virtually any nonmetallic material, such as plastic.

As discussed above, the status signal may include the serial number in addition to the status number. Thus, the receiver unit 20 may identify the pallet transmitter 18. It follows that the receiver unit 20 may be used with and uniquely identify more than one pallet transmitter 18. For example, the receiver unit 20 may communicate with a first pallet transmitter monitoring a first detector having a five PSI set-point and a second pallet transmitter monitoring a second detector having a fifty PSI set-point. In this case, the receiver unit 20 may be used to indicate when the pressure within the hydraulic system 16 is below five PSI, between five and fifty PSI, and over fifty PSI. Additionally, the receiver unit 20 may communicate with several pallet transmitters monitoring detectors in fluid communication with several different hydraulic systems.

While the present invention has been described above, it is understood that substitutions may be made. For example, the relay output 30 may actually be used to turn the machine 12 on or off, thereby insuring that the workpiece is secured to the pallet 22 before allowing the workpiece to be machined. Additionally, the power input of the receiver unit 20 may accept power at other voltages, as a matter of design. Furthermore, the pallet transmitter 18 and the receiver unit 20 may utilize different frequencies, provided that they communicate and the pallet transmitter 18 receives power over the wireless connection. These and other minor modifications are within the scope of the present invention.

Since the pallet transmitter 18 and the receiver unit 20 transmit and receive the status signal and the electromagnetic energy, one with ordinary skill in the art would recognize that the pallet transmitter 18 and the receiver unit 20 must incorporate antennas, in some form. It is important to note that the separation distance and the offset referred to above is critical only for the antennas. In the preferred embodiment, the antennas are integral to the pallet transmitter 18 and the receiver unit 20. Thus, the separation distance and the offset apply to the pallet transmitter 18 and the receiver unit 20, as described above. However, the antennas are not required to be integral to the pallet transmitter 18 or the receiver unit 20. Thus, it is possible to install the antennas with the separation distance and the offset referred to above and have the remaining portions of the pallet transmitter 18 and the receiver unit 20 installed at other distances.

In use, the operator preferably places the workpiece on the pallet 22 and activates the hydraulic system 16. The pump 23 preferably forces the fluid into the hydraulic system 16, thereby actuating the clamps 24 and the detector 14. The pallet transmitter 18 substantially continuously monitors the detector 14 and alters the status signal accordingly. The receiver unit 20 substantially continuously receives the status signal and actuates the relay output accordingly. Thus, when the pressure in the hydraulic system 16 reaches the set-point, the contacts 28 in the detector 14 preferably close, causing the status signal to change. When the status signal changes, the relay output 30 also changes, causing the warning device 32 to indicate that the workpiece is secured to the pallet 22 and that it is now safe to machine the workpiece.

Having thus described a preferred embodiment of the invention, what is claimed as new and desired to be protected by Letters Patent includes the following:

1. A machine operable to process a workpiece, the machine comprising:
    a pallet operable to support the workpiece;
    a plurality of clamps operable to secure the workpiece to the pallet;
    a hydraulic system operable to actuate the clamps;
    a pressure detector in fluid communication with the hydraulic system and operable to electrically respond to pressure within the hydraulic system;
    a pallet transmitter mounted to the pallet, electrically coupled with the detector, and operable to indicate the detector's status; and
    a receiver unit mounted at a separation distance from the pallet transmitter and operable to discern the detector's status over a wireless connection to the pallet transmitter.

2. The machine as set forth in claim 1, wherein the detector is a pressure switch operable to respond when pressure within the hydraulic system reaches a set-point.

3. The machine as set forth in claim 1, wherein the detector is an adjustable pressure switch operable to respond when pressure within the hydraulic system reaches an adjustable set-point.

4. The machine as set forth in claim 1, wherein the pallet transmitter is wired to the detector such that the detector alters the manner in which the pallet transmitter responds to the receiver unit.

5. The machine as set forth in claim 1, wherein the receiver unit substantially continuously transmits electromagnetic energy.

6. The machine as set forth in claim 5, wherein the electromagnetic energy transmitted by the receiver unit powers the pallet transmitter.

7. The machine as set forth in claim 1, wherein the pallet transmitter transmits a status signal indicative of the detector's status using only power received from the receiver unit.

8. The machine as set forth in claim 1, wherein the separation distance is no greater than eight inches.

9. The machine as set forth in claim 1, wherein the receiver unit is stationary and the pallet transmitter moves with the pallet.

10. The machine as set forth in claim 1, wherein the receiver unit includes a relay output operable to actuate a signaling device according to the detector's status as received through the pallet transmitter.

11. The machine as set forth in claim 1, wherein the pallet transmitter transmits a status signal indicative of the detector's status over the wireless connection.

12. A pallet pressure monitor capable of detecting pressure applied to a hydraulic system of a pallet, the monitor comprising:
    a pressure detector in fluid communication with the hydraulic system and operable to electrically respond to pressure within the hydraulic system;
    a pallet transmitter operable to be mounted to the pallet, electrically coupled with the detector, and indicate the detector's status; and
    a receiver unit operable to be mounted at a separation distance from the pallet transmitter and discern the detector's status over a wireless connection to the pallet transmitter.

13. The monitor as set forth in claim 12, wherein the detector is an adjustable pressure switch operable to respond when pressure within the hydraulic system reaches an adjustable set-point.

14. The monitor as set forth in claim 12, wherein the pallet transmitter is wired to the detector such that the detector alters the manner in which the pallet transmitter responds to the receiver unit.

15. The monitor as set forth in claim 12, wherein the receiver unit substantially continuously transmits electromagnetic energy that powers the pallet transmitter.

16. The monitor as set forth in claim 12, wherein the pallet transmitter transmits a status signal indicative of the detector's status using only power received from the receiver unit.

17. The monitor as set forth in claim 12, wherein the receiver unit is stationary and the pallet transmitter moves with the pallet.

18. The monitor as set forth in claim 12, wherein the receiver unit includes a relay output operable to actuate a signaling device according to the detector's status as received through the pallet transmitter.

19. The monitor as set forth in claim 12, wherein the pallet transmitter transmits a status signal indicative of the detector's status over the wireless connection.

20. A pallet pressure monitor capable of detecting pressure applied to a hydraulic system of a pallet, the monitor comprising:
    an adjustable pressure switch operable to electrically respond when pressure within the hydraulic system reaches an adjustable set-point;
    a pallet transmitter mounted to the pallet, electrically coupled with the switch, and operable to transmit a status signal indicative of the switch's status over a wireless connection; and
    a receiver unit mounted within eight inches of the pallet transmitter and operable to substantially continuously transmit electromagnetic energy over the wireless connection which powers the pallet transmitter, receive the status signal, and actuate a relay output according to the switch's status as indicated by the status signal received from the pallet transmitter.

* * * * *